(12) United States Patent
Jung et al.

(10) Patent No.: US 8,651,520 B2
(45) Date of Patent: Feb. 18, 2014

(54) INFLATOR

(75) Inventors: Christian Jung, Muhldorf (DE);
Thomas Kapfelsperger, Muhldorf (DE);
Michael Lemm, Burghausen (DE)

(73) Assignee: TRW Airbag Systems GmbH, Aschau am Inn (DE)

( * ) Notice: Subject to any disclaimer, the term of this patent is extended or adjusted under 35 U.S.C. 154(b) by 0 days.

(21) Appl. No.: 13/348,681

(22) Filed: Jan. 12, 2012

(65) Prior Publication Data

US 2012/0187667 A1    Jul. 26, 2012

(30) Foreign Application Priority Data

Jan. 24, 2011 (DE) .......................... 10 2011 009 309

(51) Int. Cl.
| | |
|---|---|
| *B60R 21/262* | (2011.01) |
| *B60R 21/272* | (2006.01) |
| *B60R 21/274* | (2011.01) |
| *B60R 21/276* | (2006.01) |

(52) U.S. Cl.
USPC ......................................... 280/737; 280/741

(58) Field of Classification Search
CPC .................................................... B60R 21/274
USPC ................................................ 280/737, 741
See application file for complete search history.

(56) References Cited

U.S. PATENT DOCUMENTS

| | | | | |
|---|---|---|---|---|
| 5,603,525 | A * | 2/1997 | Zakula .......................... | 280/737 |
| 6,382,668 | B1 * | 5/2002 | Goetz ............................ | 280/737 |
| 6,896,287 | B2 * | 5/2005 | Last et al. ..................... | 280/736 |
| 7,641,231 | B2 * | 1/2010 | Ti u ............................... | 280/736 |
| 8,136,452 | B2 * | 3/2012 | Asanuma et al. ............. | 102/530 |
| 8,186,712 | B1 * | 5/2012 | Stevens ......................... | 280/737 |
| 2005/0189750 | A1 * | 9/2005 | Gotoh et al. .................. | 280/737 |
| 2007/0057496 | A1 * | 3/2007 | Matsuda et al. .............. | 280/737 |
| 2007/0200325 | A1 * | 8/2007 | Gammill ....................... | 280/736 |
| 2007/0210567 | A1 * | 9/2007 | Krupp et al. .................. | 280/736 |
| 2007/0284863 | A1 * | 12/2007 | Bostick et al. ................ | 280/741 |
| 2008/0111358 | A1 * | 5/2008 | Jackson et al. ................ | 280/741 |
| 2008/0136154 | A1 * | 6/2008 | Lindqvist et al. ............. | 280/741 |
| 2009/0058059 | A1 * | 3/2009 | Young et al. .................. | 280/737 |
| 2010/0127486 | A1 * | 5/2010 | Asanuma ....................... | 280/737 |
| 2010/0181748 | A1 * | 7/2010 | Nakamura et al. ............ | 280/741 |
| 2010/0230943 | A1 * | 9/2010 | Kimmich et al. ............. | 280/737 |
| 2011/0079992 | A1 * | 4/2011 | Stevens ......................... | 280/741 |
| 2012/0187667 | A1 * | 7/2012 | Jung et al. ..................... | 280/737 |
| 2012/0217728 | A1 * | 8/2012 | Jackson et al. ............. | 280/728.2 |

* cited by examiner

*Primary Examiner* — Karen Beck
(74) *Attorney, Agent, or Firm* — Tarolli, Sundheim, Covell & Tummino LLP

(57) ABSTRACT

An inflator (10), especially for a vehicle occupant restraint system, comprising a combustion chamber (24) in which solid propellant (28) adapted to be burnt off while forming a gas is accommodated, a storage chamber (26) containing a pressure gas (30), an igniter (14) and a component (20) arranged between the combustion chamber (24) and the storage chamber (26). There is at least one flow communication between the storage chamber (26) and the combustion chamber (24). The component (20) includes an additional weakened zone (22) adapted to be destroyed upon activation of the inflator (10) so as to permit flow of gas from the combustion chamber (24) into the storage chamber (26).

11 Claims, 3 Drawing Sheets

INFLATOR

FIELD OF THE INVENTION

The invention relates to an inflator, especially to a vehicle occupant restraint system in accordance with the preamble of claim 1.

BACKGROUND OF THE INVENTION

Inflators are supplying, for instance, gas for inflating an airbag or for driving a belt tensioner. It is important in all cases that the generated gas is quickly made available. According to a known technology, the propellant is generated at least partially from a pressurized gas stored in the housing of the inflator. The housing is opened by a pyrotechnic igniter destroying a membrane enclosing the housing to the outside so that the gas can flow out.

SUMMARY OF THE INVENTION

In particular an inflator of the type mentioned in the beginning is known, for example, from the patent specification EP 0 874 744 B1. In the inflator described in the same a combustion chamber filled with solid propellant is arranged within a storage chamber filled with pressure gas.

It is an object of the invention to improve such inflator.

In particular such inflator is provided with a combustion chamber in which solid propellant adapted to be burnt off while forming gas is accommodated, a storage chamber filled with pressure gas, an igniter and a component disposed between the combustion chamber and the storage chamber. There is at least one flow communication between the storage chamber and the combustion chamber. The component has an additional weakened zone adapted to be destroyed upon activation of the inflator so as to permit a flow of gas from the combustion chamber to the storage chamber.

It is an advantage of the inflator that by bursting of the weakened zone an enlarged discharge orifice (larger than the flow communication) can be produced so that gas generated by combusting the solid propellant can flow more quickly into the storage chamber and through the same out of the inflator. It is especially advantageous that with this arrangement a shock wave can be generated by which the outlet membrane of the storage chamber can be opened more quickly than in the case of known inflators.

Preferably, the storage chamber is closed by a membrane against the environment of the inflator. Such membrane can be connected, preferably welded, in a pressure-tight manner to a housing component of the inflator, especially the storage chamber itself.

The component can be a cap, for instance, inserted, especially press-fitted, in a housing the inflator. It is possible to insert the component only into the housing or else to press-fit the same into the housing. In both cases the effort is reduced vis-à-vis a component that has to be welded stably in the housing in a pressure-tight manner and for years against a great pressure difference.

Preferably, the component includes at least one overflow orifice and/or an overflow orifice is formed by at least one passage formed in a circumferential wall of the component and/or an overflow orifice is formed by at least one passage formed in a wall of the housing (12). So pressure compensation between the storage chamber and the combustion chamber can be reached. Advantageously, the overflow orifice is permanently opened at least prior to activation. The passage is preferably arranged outside the weakened zone and extends in axial direction, i.e. in parallel to the longitudinal axis of the housing. In a preferred manner, plural, for example three, passages equally spaced along the periphery of the component.

It is of advantage when the sum of all flow cross-sections of the at least one overflow orifice is less at least by the factor 5, preferably by the factor 10, than the flow cross-section of the flow orifice formed by the destroyed weakened zone. It has shown that with such constellation upon igniting the inflator the pressure loss through the overflow orifices is insignificant to safe opening of the both the weakened zone and the membrane toward the environment of the inflator.

While the combustion chamber is opened vis-à-vis the storage chamber, at least through the overflow orifices in the component, the igniter is closed in a preferably gas-tight and/or pressure-tight manner vis-à-vis the combustion chamber, preferably by an igniting membrane.

The weakened zone is preferably formed by embossing or milling and/or notches and/or laser abrasions. All these are techniques by which an opening force easy to reproduce and thus the bursting pressure can be precisely adjusted in a simple manner, for example by way of the number and the depth of the different areas of the weakened zone.

In a preferred manner, the housing forms a pressure chamber which is divided into the combustion chamber and the storage chamber by means of the component. Apart from the overflow orifices in the component, preferably no flow communication is provided between the storage chamber and the combustion chamber.

The embossings are preferably formed so as to be less deep than the material thickness of the component and do not break the latter.

The weakened zone of the component and the membrane may be arranged on a longitudinal axis A of the inflator and/or opposite to each other and/or on two opposed sides of the storage chamber.

By means of the igniter a shock wave can be generated by which the membrane can be destroyed. The afore-mentioned position of the weakened zone and the membrane with respect to each other can especially have a positive effect on the efficiency of the shock wave and thus the destruction of the membrane. Also in the case of the inflator presented here the destruction of the weakened zone of the component advantageously generates a shockwave which extends at least in portions through the storage chamber and destroys the membrane as it is known from the state of the art. It has turned out that generating a shock wave and safely opening the membrane toward the environment of the inflator is performed without problem also in the case of a combustion chamber filled with pressure gas, especially even when there is a flow communication between the storage chamber and the combustion chamber.

The storage chamber is filled, for instance, with argon, helium or a gas mixture under pressure of up to 500 Bars. It is advantageous that the component closing the storage chamber against the combustion chamber neither has to withstand great forces nor has to be manufactured and inserted in the housing with great effort, as there is at least one flow communication to the combustion chamber in which equally the gas mixture is provided (in the cavities between the solid propellant tablets) at the same pressure.

In addition, it is possible to arrange a screen in the combustion chamber, preferably in line with the weakened zone of the component and the membrane. It is possible in this way to withhold potential burn-off particles that might be formed by burning off the solid propellant.

In particular, the housing can have an annularly circumferential indentation on which the component is supported.

It is further advantageous that the igniter, the igniting membrane and the membrane and/or the screen and the weakened zone of the component are located on the longitudinal axis A of the inflator. In this way optimum ignition of the solid propellant and/or of the pressure gas as well as an efficient formation and propagation of the shock wave and thus destruction of the membrane is achieved. This serves ultimately for a safe and quick functioning of the inflator.

The inflator can be part of a module comprising an airbag inflatable by the inflator and a fastening means for mounting the module, especially in the interior of the vehicle, wherein the inflator is designed in accordance with at least one of the afore-described configurations.

Further advantages and features of the invention are resulting from the following description of plural variants with respect to the enclosed drawing, in which

DESCRIPTION OF EMBODIMENTS

Figure 1:
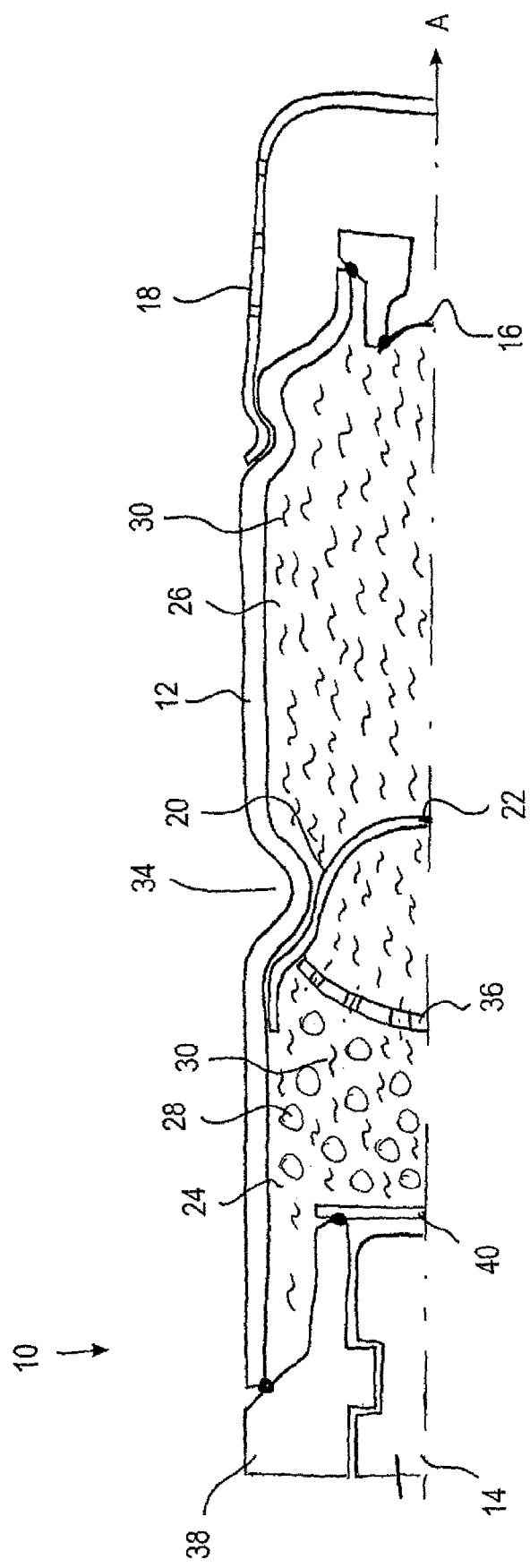
FIG. 1 shows a schematic cross-section across an inflator according to the invention, with only one half of the inflator being illustrated.

FIG. 1 illustrates an inflator 10 including an elongate cylindrical housing 12 at the first axial end of which an igniter 14 is provided and at the second axial end of which the housing 12 is closed by a membrane 16 against the environment of the inflator 10. The housing 12 forms the outer housing of the inflator 10. A diffuser 18 provided with discharge orifices in a known manner is connected to the housing 12 in axial direction and guides the gas flowing out to its location, for instance to an inflatable airbag that is not shown.

A component 20, here in the form of a cap pressed into the housing 12 and having an embossed weakened zone 22, divides the housing 12 in the direction of the longitudinal axis A of the inflator into a combustion chamber 24 and a storage chamber 26. In the direction of the longitudinal direction A of the inflator the combustion chamber 24 in which a predetermined amount of solid propellant 28, here in tablet form, is accommodated is formed in the housing 12 adjacent to the igniter 14.

The storage chamber 26 separated from the combustion chamber 24 by the component 20 is filled with compressed gas 30 (for instance argon, helium or a suited gas mixture). The component 20 does not close the storage chamber 26 against the combustion chamber 24 in a pressure-tight manner so that a flow communication is provided between the two chambers. Because of this, during manufacture of the inflator 10, when filling the storage chamber 26 with compressed gas 30 the gas flows through overflow orifices 32 in the component 20 (see for example FIG. 2) also into the combustion chamber 24 until a pressure compensation is reached between the two chambers 24, 26. Prior to activating the inflator 10, compressed gas 30 is provided both in the storage chamber 26 and in the combustion chamber 24 in mutual flow communication.

In the variant shown here the component 20 is pressed into the housing 12, however it could also be simply inserted in the housing 12 or fastened in any other way.

In the area where the component 20 is mounted in the housing 12 an annularly circumferential indentation 34 on which the component 20 is supported and which additionally secures the component 20 is provided in the housing 12.

In order to withhold potential burn-off particles a screen 36 may be inserted ahead of the component 20 in the combustion chamber 24.

The igniter 14 is separated from the combustion chamber 24 in a pressure-tight and gas-tight manner. For this purpose, an igniter carrier 38 in which the igniter 14 is accommodated is closed by an igniter membrane 40. The igniter membrane 40 can be, for instance, a sheet plate made of stainless steel or carbon steel or a similar part that is easy to manufacture.

Upon activation of the inflator 10 in a known manner the igniter 14 receives an electric signal to ignite the same. The related sudden increase in pressure in the igniter 14 initially destroys the igniter membrane 40 and ignites the solid propellant 28 in the combustion chamber 24. Due to the sudden increase in pressure in the combustion chamber 24 the weakened zone 22 in the component 20 (cf. FIG. 2, for example) is destroyed so that abruptly a large opening related to the diameter of the housing 12 is formed in the component 20. This abrupt opening generates a shock wave entering the storage chamber 26 and passing the same up to the membrane 16. The pressure gas 30 in the storage chamber 26 need not heat significantly. In the area of a local shock wave front there is an extremely short-term increase in pressure which frequently exceeds the bursting pressure of the membrane 16 and opens the latter only in the area of the shock wave. In this way, very early opening after activation of the inflator 10 is effectuated. The temperature in the combustion chamber can be, for instance, within the range of 2900 K, wherein the pressure in the combustion chamber 24 can increase to values ranging from 875 to 1125 Bar. The velocity of the shock wave can be between 750 and 1250 m/sec.

The inflator illustrated here can be used, for example, for inflating an airbag, especially a passenger airbag, but also for other purposes.

The component 20 can have a quite variable design. It is merely necessary that prior to activating the inflator 10 a pressure compensation can take place between the storage chamber 26 and the combustion chamber 24 and the weakened zone 22 is reliably destroyed upon activation of the inflator 10.

Figure 2:
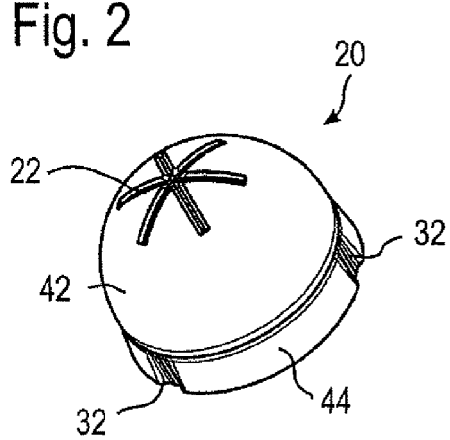
FIGS. 2 to 4 show views of a component for an inflator according to the invention in a first variant.
Figure 3:
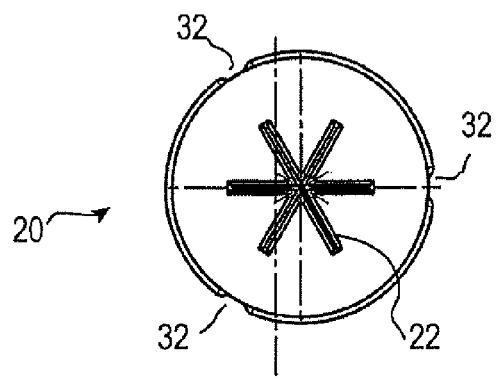
Figure 4:
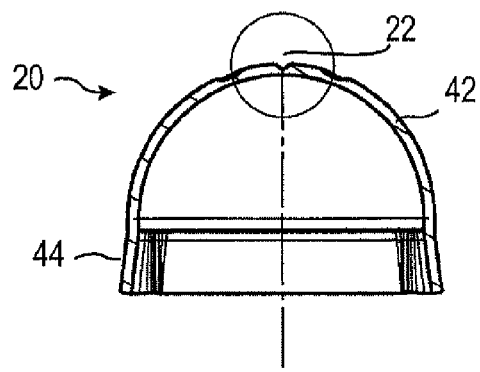

A first variant of the component 20 is shown in detail in the FIGS. 2 to 4. The component 20 substantially exhibits the form of a cap having an approximately hemi-spherical cover 42 including an adjacent frusto-conical circumferential wall 44. In the crest of the cover 42 a star-shaped embossing is provided that forms the weakened zone 22. The bursting pressure of the weakened zone 22 can be adjusted by way of the number, the length and the depth of the embossings in a very accurate and well reproducible fashion. Apart from the shown star-shaped embossing, the weakened zone 22 can also have a cross-shaped, C-shaped or ring-shaped embossing.

In the circumferential wall 44 three axially extending passages evenly spaced along the periphery are designed as overflow orifices 32. When the component 20 is inserted in the housing 12, the overflow orifices 32 form a flow communication between the storage chamber 26 and the combustion chamber 24, because the circumferential wall 44 of the component 20 is not completely adjacent to the inner wall of the housing 12 but is spaced apart therefrom in the area of the overflow orifices 32.

It is possible to press-fit the component 20 or else to merely insert the same in the housing 12 without press-fitting.

Upon activation of the inflator 10 the embossing ruptures in the weakened zone 22 so that a relatively large opening occurs which preferably extends beyond more than half of the entire diameter of the housing 12. The amount of gas which upon activation of the inflator 10 flows through the overflow orifices 32 bypassing the component 20 from the combustion chamber 24 into the storage chamber 26 is negligible and smaller by at least the factor 10 than the amount of gas flowing through the ruptured weakened zone 22. Thus the overflow orifices 32 have no influence on the generation of the shock wave by destruction of the weakened zone 22.

The component 20, and especially the circumferential wall 44 thereof, can also be configured such that, when the pressure is increased in the combustion chamber 24, in this area and in the area of the overflow orifices 32 the component 20 is adjacent to the inner wall of the housing 12 so that the overflow orifices 32 are closed completely or partly by deformation of the circumferential wall 44.

Figure 5:
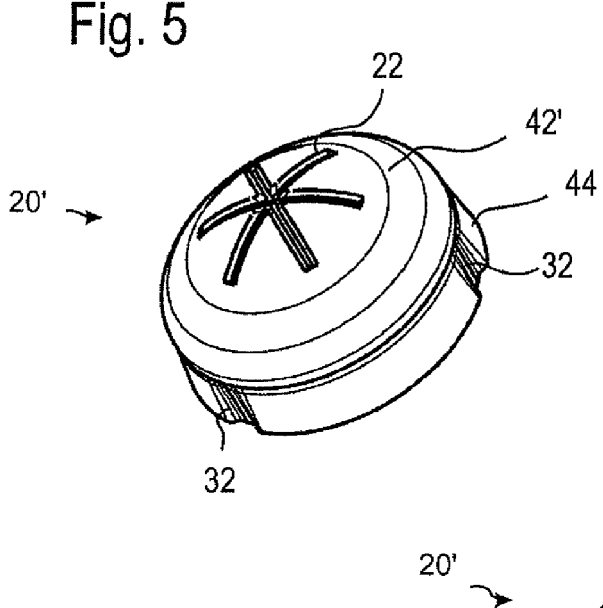
FIGS. 5 and 6 show views of a component for an inflator according to the invention in a second variant.
Figure 6:
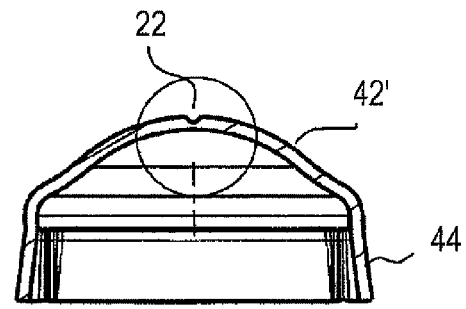

The FIGS. 5 and 6 illustrate a component 20' in a second variant. The frusto-conical circumferential wall 44 including the overflow orifices 32 is configured identically to the afore-described embodiment. The cover 42' has a flatter curvature than in the afore-described component 20, however. The embossing in the weakened zone 22 is star-shaped in this case, too.

Figure 7:
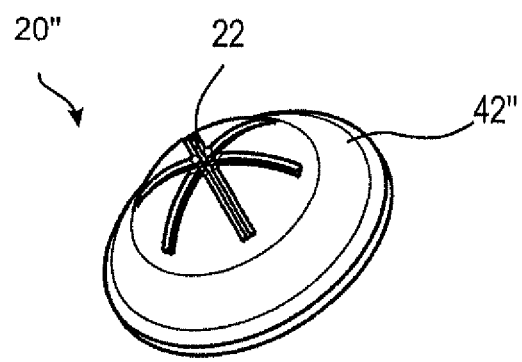
FIGS. 7 and 8 show views of a component for an inflator according to the invention in a third variant.
Figure 8:
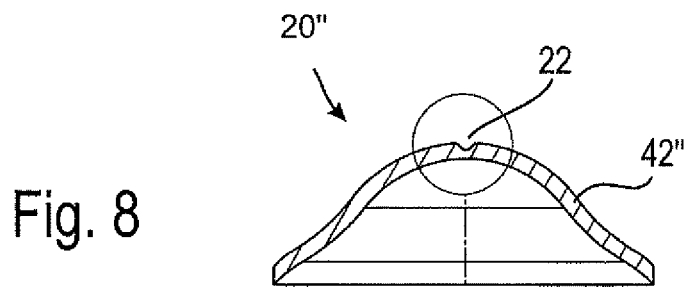

The FIGS. 7 and 8 illustrate a third variant of the component 20. In this case the component 20" merely consists of the cover 42". In the marginal area the cover 42" is curved in a slightly convex manner so as to permit better fitting into the housing 12. It is also imaginable that the cover 42" has no curvature and thus has a substantially planar shape. Here, too, the weakened zone 22 is configured by a star-shaped embossing. In this case no specifically formed overflow orifices are provided and the pressure compensation between the storage chamber 26 and the combustion chamber 24 is performed preferably by the fact that the component 20" is not inserted in the housing 12 in a pressure-tight manner.

The inflator may also be mounted in a module comprising an airbag inflatable by the inflator and a fastening means for mounting the module, especially in the interior of a vehicle, the inflator being designed according to at least one of the afore-described configurations. The module, the airbag and the fastening means for mounting the module are not illustrated in the figures.

The invention claimed is:

1. An inflator (10) for a vehicle occupant restraint system, comprising a combustion chamber (24) in which solid propellant (28) adapted to be burnt off while forming a gas is accommodated, a storage chamber (26) containing pressure gas (30), an igniter (14) and a component (20) arranged between the combustion chamber (24) and the storage chamber (26), wherein at least one flow communication is provided between the storage chamber (26) and the combustion chamber (24) prior to activation of the inflator (10), characterized in that the component (20) has an additional weakened zone (22) adapted to be destroyed upon activation of the inflator (10) so as to permit flow of gas from the combustion chamber (24) into the storage chamber (26).

2. The inflator (10) according to claim 1, characterized in that the storage chamber (26) is closed by a membrane (16) against the environment of the inflator (10) and/or characterized in that the component (20) is a cap inserted and press-fitted in a housing (12) of the inflator (10).

3. The inflator (10) according to claim 1, characterized in that the component (20) has at least one overflow orifice (32) and/or characterized in that an overflow orifice (32) is formed by at least one passage formed in a circumferential wall (44) of the component (20) and/or that an overflow orifice is formed by at least one passage formed in a wall of the housing (12).

4. The inflator (10) according to claim 1, characterized in that the sum of all flow cross-sections of at least one overflow orifice (32) is smaller at least by the factor 10, than the flow cross-section of the flow opening formed by the destroyed weakened zone (22).

5. The inflator (10) according to claim 1, characterized in that the igniter (14) is closed against the combustion chamber (24) by an igniter membrane (40), in a gas-tight manner and/or characterized in that the weakened zone (22) is formed by embossings and/or millings and/or notches and/or laser abrasions.

6. The inflator (10) according to claim 1, characterized in that the housing (12) constitutes a pressure chamber divided into the combustion chamber (24) and the storage chamber (26) by means of the component (20) and/or characterized in that a shock wave by which a membrane (16) is destroyable can be generated by means of the igniter (14).

7. The inflator (10) according to claim 1, characterized in that the weakened zone (22) of the component (20) and a membrane (16) are located on a longitudinal axis A of the inflator and/or are opposed to each other and/or are arranged on two opposite sides of the storage chamber (26).

8. The inflator (10) according to claim 1, characterized in that a screen (36) is arranged in the combustion chamber (24) in line with the weakened zone (22) of the component (20) and a membrane (16) and/or characterized in that the housing (12) includes an annularly circumferential indentation (34) on which the component (20) is supported.

9. The inflator (10) according to claim 1, characterized in that the igniter (14), an igniter membrane (40) and a membrane (16) and/or the screen (36) and the weakened zone (22) of the component (20) are located on the longitudinal axis A of the inflator.

10. A module comprising an inflator (10), an airbag inflatable by the inflator (10) and a fastening means for mounting the module in the interior of a vehicle, characterized in that the inflator (10) is configured in accordance with claim 1.

11. An inflator for a vehicle occupant restraint system, comprising:
   a combustion chamber;
   a storage chamber containing pressurized gas;
   an igniter; and
   a component arranged between the combustion chamber and the storage chamber, the component being rupturable upon activation of the inflator to permit flow of gas from the combustion chamber into the storage chamber,
   wherein prior to rupture the component permits fluid communication between the storage chamber and the combustion chamber.

* * * * *